United States Patent Office.

JOHN A. MOFFITT, OF BOSTON, MASSACHUSETTS.

Letters Patent No. 84,702, dated December 8, 1868; antedated November 25, 1868.

IMPROVED WATER-PROOF PAINT.

The Schedule referred to in these Letters Patent and making part of the same.

*To all whom it may concern:*

Be it known that I, JOHN A. MOFFITT, of Boston, in the county of Suffolk, and Commonwealth of Massachusetts, have invented and discovered a new Water-Proof Paint and Coating, to wit, India rubber, gutta-percha, or balatta, and benzine or naphtha, mixed with arsenic, arsenic acid, or the substance known as the "universal deodorizing-powder," as driers, with or without oils and pigments, said combination to be used as a coating or paint for walls, plaster, paper, wood, wood-hangings, metals, and cloth. Said combination to be made of said articles in proportion as follows:

Benzine or naphtha, ninety-six (96) parts.

India rubber, gutta-percha, or balatta, from one (1) to four (4) parts.

Arsenic, arsenic acid, or the "universal deodorizing-powder," from four (4) to eight (8) parts.

When oils and pigments are used—

Oils, sufficient to give the combination any required consistency.

Pigments, sufficient to give the combination any required shade or color.

What I claim as my invention, and desire to secure by Letters Patent, is—

1. The combination of either India rubber, gutta-percha, or balatta, with benzine or naphtha, and either arsenic, arsenic acid, or the "universal deodorizing-powder," as driers, in manner and for the purposes hereinbefore described.

2. The combination of either India rubber, gutta-percha, or balatta, with benzine or naphtha, and either of said driers, arsenic, arsenic acid, or the "universal deodorizing-powder," with oils and pigments, in the manner and for the purposes hereinbefore described.

3. The application of arsenic, arsenic acid, or the "universal deodorizing-powder," as driers for India rubber, gutta-percha, or balatta.

JOHN A. MOFFITT.

Witnesses:
J. H. MUNROE,
HENRY WALKER.